(12) United States Patent
Pistauer et al.

(10) Patent No.: US 10,587,610 B2
(45) Date of Patent: Mar. 10, 2020

(54) METHOD FOR AUTHORIZATION MANAGEMENT IN AN ARRANGEMENT HAVING MULTIPLE COMPUTER SYSTEMS

(71) Applicant: CISC Semiconductor GmbH, Klagenfurt (AT)

(72) Inventors: Markus Pistauer, Viktring (AT); Manfred Jantscher, Graz (AT); Stephan Gether, Feldbach (AT)

(73) Assignee: CISC SEMICONDUCTOR GMBH, Klagenfurt (AT)

(*) Notice: Subject to any disclaimer, the term of this patent is extended or adjusted under 35 U.S.C. 154(b) by 237 days.

(21) Appl. No.: 15/548,198

(22) PCT Filed: Jan. 29, 2016

(86) PCT No.: PCT/EP2016/051980
§ 371 (c)(1),
(2) Date: Aug. 2, 2017

(87) PCT Pub. No.: WO2016/124506
PCT Pub. Date: Aug. 11, 2016

(65) Prior Publication Data
US 2018/0034800 A1 Feb. 1, 2018

(30) Foreign Application Priority Data
Feb. 3, 2015 (DE) .......... 10 2015 101 523

(51) Int. Cl.
*H04L 29/06* (2006.01)
*H04L 9/32* (2006.01)
*H04L 9/08* (2006.01)

(52) U.S. Cl.
CPC .......... *H04L 63/083* (2013.01); *H04L 9/0861* (2013.01); *H04L 9/321* (2013.01); *H04L 9/3247* (2013.01); *H04L 63/0807* (2013.01); *H04L 63/102* (2013.01); *H04L 2463/082* (2013.01)

(58) Field of Classification Search
CPC . H04L 63/083; H04L 63/0807; H04L 63/102; H04L 9/0861; H04L 9/321; H04L 9/3247; H04L 2463/082
See application file for complete search history.

(56) References Cited

U.S. PATENT DOCUMENTS

| | | | |
|---|---|---|---|
| 6,594,229 B1 | 7/2003 | Gregorat | |
| 6,842,741 B1 | 1/2005 | Fujimura | |
| 7,891,012 B1 * | 2/2011 | Kiel | G06F 21/554 726/30 |
| 9,240,992 B2 | 1/2016 | Dietrich | |
| 9,497,224 B2 * | 11/2016 | Sweet | G06F 21/55 |
| 2003/0061492 A1 | 3/2003 | Rutz et al. | |
| 2006/0010074 A1 * | 1/2006 | Zeitsiff | G06F 21/10 705/52 |

(Continued)

FOREIGN PATENT DOCUMENTS

| | | |
|---|---|---|
| DE | 10056135 A1 | 5/2002 |
| DE | 69932294 T2 | 7/2007 |

(Continued)

*Primary Examiner* — Sarah Su
(74) *Attorney, Agent, or Firm* — Slater Matsil, LLP

(57) ABSTRACT

A method for authorization management in an arrangement having multiple computer systems is disclosed.

19 Claims, 1 Drawing Sheet

(56) References Cited

U.S. PATENT DOCUMENTS

| | | | |
|---|---|---|---|
| 2009/0319682 A1* | 12/2009 | Nassor | H04N 21/23406 709/235 |
| 2010/0070760 A1* | 3/2010 | Vanderveen | H04L 63/0823 713/156 |
| 2011/0035589 A1* | 2/2011 | Butcher | G06F 21/10 713/168 |
| 2011/0184993 A1* | 7/2011 | Chawla | G06F 9/45533 707/802 |
| 2013/0055346 A1* | 2/2013 | Singh | G06F 21/34 726/3 |
| 2013/0203378 A1* | 8/2013 | Vos | H04W 4/24 455/406 |
| 2013/0318343 A1* | 11/2013 | Bjarnason | H04L 41/0809 713/157 |
| 2015/0096042 A1* | 4/2015 | Mizrachi | H04L 63/0421 726/26 |
| 2016/0142380 A1* | 5/2016 | Fuller | G06F 21/6254 726/9 |

FOREIGN PATENT DOCUMENTS

| | | |
|---|---|---|
| DE | 102009027682 A1 | 1/2011 |
| WO | 2010030516 A2 | 3/2010 |
| WO | 2013171008 A1 | 11/2013 |

* cited by examiner

METHOD FOR AUTHORIZATION MANAGEMENT IN AN ARRANGEMENT HAVING MULTIPLE COMPUTER SYSTEMS

This patent application is a national phase filing under section 371 of PCT/EP2016/051980, filed Jan. 29, 2016, which claims the priority of German patent application 10 2015 101 523.4, filed Feb. 3, 2015, each of which is incorporated herein by reference in its entirety.

TECHNICAL FIELD

The invention relates to a method for managing authorizations in an arrangement having multiple computing systems.

BACKGROUND

Various methods and systems which permit authorization of a permission with different authentication means are known from the prior art. Mobile devices may be used to replace conventional keys, ID cards or payment cards. However, since most of the mobile devices are per se not to be considered as being secure, common systems rely on an online verification on corresponding servers or a secure execution element installed in the mobile terminal, which is often called a secure element. However, most mobile devices available today do not have a secure element, and, if this element is provided, access management is very complex and access is least of all not possible for external developers, respectively. Systems that require an online verification are not possible or are only possible to a limited extent in many applications, since these applications depend on a stable data connection which cannot be ensured all the time.

DE 10 2009 027 682 A1 discloses such a method for secure authentication by means of a so-called hardware token, which is an additional portable device. This approach comes with the disadvantage that an additional device must be carried along.

EP 2 768 199 A1 discloses a method that enables granting and forwarding of permissions by means of a telecommunication terminal and a secure element. The disadvantage lies with the prerequisite of a Secure Element.

SUMMARY OF THE INVENTION

Embodiments provide a comfortable authorization mechanism for granting authorizations for operators and users, respectively, for executing applications on an application system, which does not require a special hardware, in particular a secure element, and which can dispense with an online verification, without neglecting the desired flexibility and security.

Embodiments provide one or multiple components and fulfil at least three tasks. A first task lies with the generation of data packets, the so-called tokens, which permit authentication of a user as well as the allocation of permissions. A second task lies with the provision of the actual functions, which are to be accessed by a user. A third task is the verification whether the user has the required permission therefor. The first task is assumed by a token computing system. In an advantageous embodiment, the third task can be assumed by an independent kiosk computing system located in the application system, the kiosk computing system used for communication with the user, inter alia.

In this respect, the kiosk computing system forms a distinct logical unit having a distinct assigned computing unit. The user communicates with the application system via the kiosk computing system using one or multiple user computing systems logically assigned to this user, which also each comprise a computing unit.

The authorization mechanism is based on creation, storage, distribution and further processing of electronically signed permissions in the form of data packets and tokens, respectively, in certain temporal sequences using the three above-mentioned components token computing system, kiosk computing system and user computing system.

In addition, corresponding infrastructures of the interconnected computing units are described, which result from temporary connections for the exchange of the tokens amongst one another, the so-called token infrastructure. An further aspect of the invention lies with the subdivision of the authorization mechanism into at least two or multiple electronic or electronically signed data packets, which depend on one another but are created independently from one another. These packets are defined as follows:

a. First data packet, also called recognition data packet or authentication token, for the identification of a user, possibly by means of or complementary by a user computing system, who wants to receive a permission for execution of an application at the application system;

b. Second data packet, also called permission data packet or permission token, for the authorization of the user for the execution of applications at the application system.

An authentication token is an electronically signed data set having a unique ID and a digital public key which is assignable to the user computing system, this key being created and signed by an authentication computing unit of the token computing system. With this token and with an associated private key stored on the user computing system, the authentication of a user computing system and its assigned user can be performed with the aid of cryptographic methods. Furthermore, the token is designed in such a way that various properties can be stored with it, e.g., the validity period.

A permission token is a data set signed by a permission computing unit of the token computing system, the data set characterized by being assigned to an authentication token and used to assign permissions for a limited or unlimited period of time. A permission token can always only be used in connection with an authentication token. Preferably, each permission token is assigned to one application and one service, this service describing a product, a service or an action which is triggered or enabled by the grant of the permission. When the permission token with the "access" application and "open door no. 1" service is used, for example, the door opener of door 1 is actuated. In addition, a permission token may contain application-specific data.

Further aspects to be mentioned are a predetermined temporal sequence in the generation of the electronic data packets, the signing thereof and the storage thereof within the token infrastructure consisting of the token computing system, the kiosk computing system and the user computing system as well as a divisibility of the permission mechanism into per se closed functional units and allocation of these functional units to one or multiple computing units within the system as a whole.

In the context of the invention, the term "permission" includes:

a) the possibility of performing a certain function provided by the application system for the user; or b) the possibility of performing certain functions for the user which are provided by a system that is connected to the application system; or c) an acoustic, optical, haptic information or any combination of these presentation forms generated by the application system, at the application system or on a system that is connected to the application system. In this case, consequently a permission is not used to execute an application or the like, but the fact that the permission has been granted is displayed. This is advantageous in particular if a person or an image recognition system are to react to this fact.

The permission takes the Boolean value "true" and "valid" or "false" and "invalid", respectively. The Boolean value "true" can additionally be limited in terms of time, location and/or additional suitable application specific criteria by additionally indicating a time period, a time, geo coordinates, namely a location, or application-specific criteria or an any combination thereof.

Within the different possible embodiments of the token infrastructure, a method for creating at least one authentication token as well as at least one permission token is created, wherein these tokens are used for (a) the unambiguous and secure recognition—"authentication"—of the user computing systems, and (b) for the granting of various permissions.

The authenticity of the connected user computing system and the user thereof can be determined using the authentication token by means of cryptographic methods.

The permission token represents a permission and can be assigned to exactly one user due to its dependence on exactly one authentication token. The validity of the permission token can be determined by cryptographic methods. The issuing of an authentication token and a permission token can only be effected by the token computing system, wherein the issuing can be initiated by various trustworthy entities.

The various verifications done before enabling a function and described in claim 1 under d) can be performed in the specified order or an altered order. Thus, it is also possible that the verification to determine whether the authentication token and the permission token are associated is performed prior to a signature verification.

In an advantageous embodiment of the invention, a preselection of the data packets to be transmitted to the kiosk computing system is effected. This reduces the data volume to be transmitted, which results in significant speed advantages depending on the data transmission technology used.

Due to the preselection, only data packets that could potentially "fit" are transmitted to the kiosk computing system, e.g., depending on a device category. To that end, the kiosk computer system communicates the type of device to the user computing system. For example, an electronic door lock within reach of a smartphone informs the smartphone that "I am a door lock". In this case, the smartphone would only transmit permission tokens to the door look that are potentially suitable for use with a door lock.

In another variant, the preselection is effected by an application of, e.g., a smartphone, which selects suitable tokens then. "Open door" implicates that only door-related permission tokens are to be transmitted to the kiosk computing system.

BRIEF DESCRIPTION OF THE DRAWINGS

The invention will hereinafter be described by means of figures. The figures show in.

DETAILED DESCRIPTION OF ILLUSTRATIVE EMBODIMENTS

Figure 1:
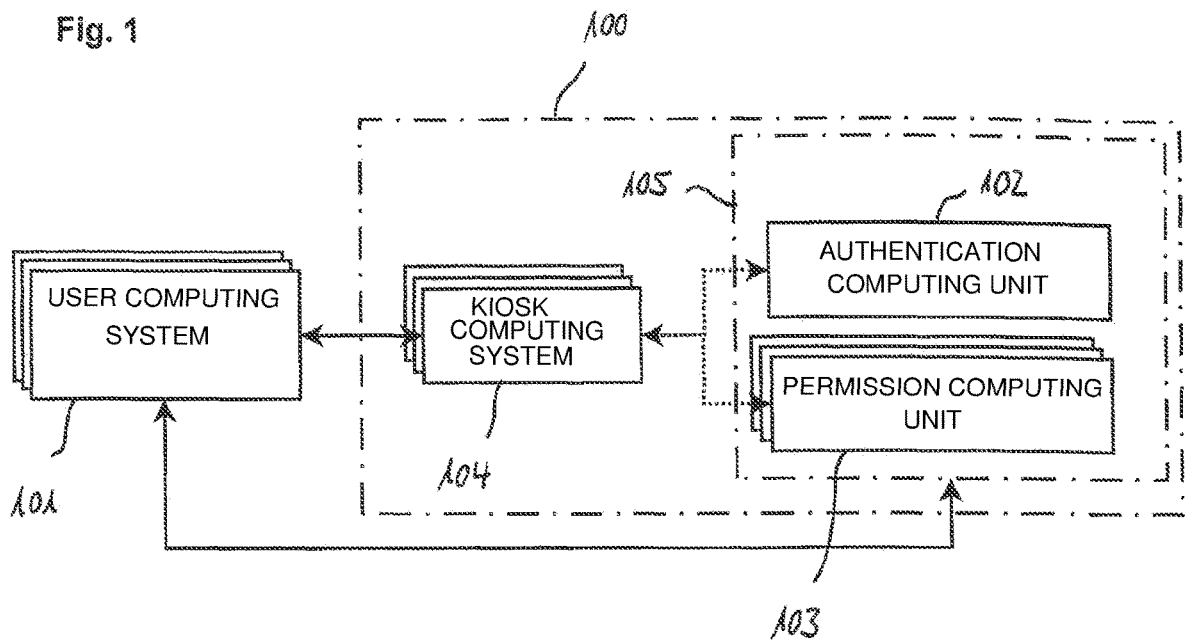
FIG. 1 the structure of an overall system, in which the method according to the invention is performed, and FIG. 2 a block circuit diagram for the flow of the method according to the invention.

First, an exemplary general structure of the overall system is described by means of FIG. 1, in which the method according to the invention is performed. The system as a whole can have various architectures. In this exemplary embodiment, it is composed of the following components: a token computing system 105, one of the main components of the application system; at least one kiosk computing system 104, which is assigned to the application system wo as a distinct logical unit and whose physical communication unit is represented by the user computing systems 101; and at least one user computing system 101, which is assigned to a user, having a communication unit. A user may have one main device and multiple secondary devices, which can be selectively treated equally or differently in the scope of the described authorization mechanism.

The token computing system 105 is a plurality of processing routines performing their functions in the form of functional units together on one or on multiple physical computing units. At least the following functional units can be distinguished, which at least temporarily establish a data connection amongst one another: one unit for managing and storing data and authentication token assigned to the users of the application system; this is the authentication computing unit 102; at least one unit for managing and storing the authorizations of users of the application system and permission token; this is the permission computing unit 103.

The kiosk computing system 104 is a communication unit of the application system 100 having distinct assigned computing units. The kiosk computing system comprises at least one physical interface for communication with a user computing system 101, in particular wireless communication technologies such as RFID/NFC, Bluetooth LE or WiFi and optical communication technologies, e.g., using QR codes, can be considered. The kiosk computing system 104 may comprise an interface to the token computing system 105, via which a data connection can exist at least temporarily.

The user computer system 101 is a plurality of processing routines performing their function on a system with communication unit, the system is assigned to the user. It comprises at least one physical interface for communication with the kiosk computing system 104, in particular RFID/NFC, Bluetooth LE, WiFi and possibly a display for representation of QR codes. The user computing system 101 also comprises an interface to the token computing system 105, via which at least temporarily a data connection must be established. It is advantageous when the user computing system 101 is a mobile device. Suitable mobile devices are a smartphone, a tablet, a smartwatch or even a proprietary device, for example.

The three components of the overall system, the token computing system 105, the kiosk computing system 104 and the user computing system 101 together form the token infrastructure.

Each user computing system assigned to the application system has exactly one authentication token at any time, but has stored any number of permission tokens.

Figure 2:
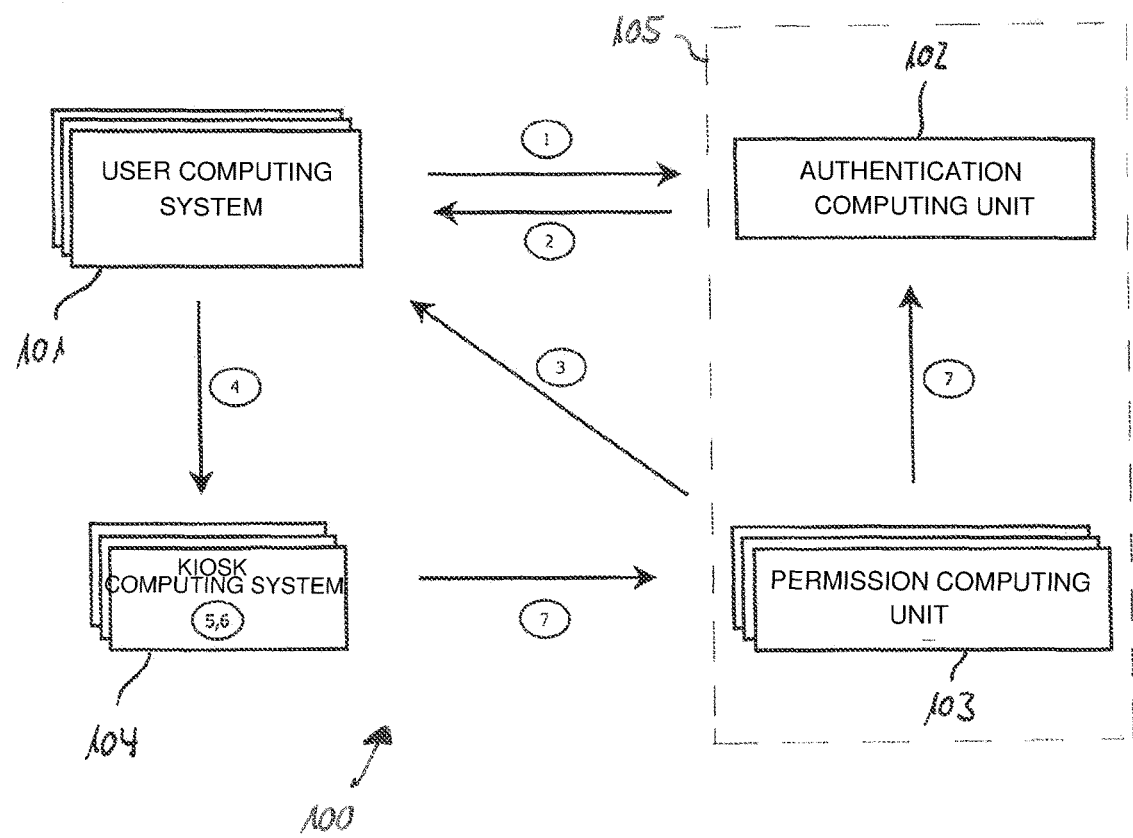

In an exemplary basic configuration, the method includes the following steps and is illustrated in FIG. 2.

Step 1: Storage of data assigned to a user in the token computing system 105;

Step 2: Issuing of at least one authentication token and storage on at least one unit of the application system wo and storage on at least one unit of the user computing system 101;

Step 3: Issuing of at least one permission token and storage on at least one unit of the application system 100 and storage on at least one unit of the user computing system 101;

Step 4: Transmission of an authentication token and at least one permission token via a physical interface from the user computing system 101 to the kiosk computing system 104;

Step 5: Verifying the authentication token at the kiosk computing system 104;

Step 6: Verifying the permission token at the kiosk computing system 104;

Step 7: Optionally forwarding the tokens to the token computing system 105 as well as verifying the tokens at the token computing system 105.

Subsequently: Execution of the application according to the permission on the application system.

Based upon this method, various embodiments and advantageous embodiments are possible, which are summarized in the following.

1) In one embodiment of the described permission mechanism, the data stored on an authentication computing unit 102 of the token computing system 105 include information about the identity of a user. Due to this information, one or multiple user computing system 101 can be assigned to a user.

2) In another embodiment, the data stored on the authentication computing unit 102 do not include any information about the identity of a user. In this case, the permission mechanism is available to the user only temporarily and exclusively by assignment of one single user computing system 101.

3) In a variant of the embodiment described in 1), exactly one user computing system 101 is defined as a main user computing system. Due to applications-specific criteria, the Boolean value "true" of a permission can now be restricted to the use with the main user computing system 101.

4) In one embodiment, the token computing system 105 is subdivided at least into one authentication computing unit 102 and one or multiple permission computing units 103. In one embodiment, these units are allocated to multiple physical computing units. The assignment of user computing systems 101 is based upon data that is stored in the authentication computing unit 102. The assignment of user computing systems 101 and permission computing units 103 is done by the exchange of assignment data packets, so-called tickets, between the units of the token computing system 105 as well as between the token computing system 105 and the user computing system 101.

As used herein, the term "ticket" is considered to be a digital ticket, which is used as a distributed authentication service. Incidentally, the ticket consists of a random number, which provides high security by a relatively short validity, and is used to establish the connection to stored structural information of users, e.g., user accounts, on the used servers of the computer system. However, the algorithm can also be replaced by a standard Kerberos service or the like.

5) In one embodiment, the kiosk computing system 104 includes a mechanism for the setting of relevant permissions. Due to this setting, the permission tokens to be transmitted from the user computing system 101 to the kiosk computing system 104 can be restricted when the used physical interface for communication supports this. The setting of the relevant permissions is effected statically or dynamically depending on the application and, in the latter case, can change at any time due to time, location and/or other application specific criteria. In this way, a pre-selection of the tokens to be transmitted can take place.

6) In one embodiment, the user computing system 101 includes another mechanism for selection of the permissions relevant for transmission. Due to this setting, the permission tokens to be transmitted from the user computing system 101 to the kiosk computing system 104 can be restricted. The setting of the relevant permissions is effected due to a user context, which is composed of time, location and/or other application relevant criteria.

7) In a further embodiment, the user computing system 101 includes an interface for interaction with a user, which permits the user to determine relevant permissions. Due to this setting, the permission tokens to be transmitted from the user computing system 101 to the kiosk computing system 104 can be restricted.

8) Embodiments of the invention may include any combinations of the embodiments described under 5), 6) and 7).

9) In one embodiment of the invention, the Boolean value "true" of a permission can be restricted to the following verification by the token computing system 105 due to application-specific criteria. In this case, authentication tokens and permission tokens must be forwarded from the kiosk computing system 104 to the token computing system 105 for verification purposes.

10) According to embodiments of the invention, the Boolean value "true" of a permission can be made dependent on an additional determination of the identity of the user due to application-specific criteria. To that end, at least one interface is provided at the kiosk computing system 104 and/or at the user computing system 101, which is suitable to determine the identity of a user. In addition, the method is extended by a step of identification of the user. The determination of the identity can be effected prior to or after transmission of the tokens from the user computing system 101 to the kiosk computing system 104.

11) In one embodiment, the validity period of authentication tokens is restricted independently from permissions tokens by specification of a time period stored in the authentication token. Now, authentication tokens are created at regular intervals and again stored at the token computing system 105 and at the user computing system 101. The existing authentication tokens are being replaced. Due to the dependency from permission tokens with in each case exactly one authentication token, all assigned permission tokens are re-created in the further course and stored again on the token computing system 105 and the user computing system 101. The existing permission tokens are being replaced in the user computing system 101 and become invalid in the token computing system 105.

12) In one embodiment, the revocation of previously granted permissions is made possible. To that end, the corresponding permission tokens are marked as invalid or cancelled at the token computing system 105. In the further course, the corresponding permission tokens are cancelled by the user computing systems 101. The revocation of a permission can be initiated by different trustworthy entities, but can only be effected by the token computing system.

13) For a more effective detection of the invalid permission tokens described under 12) during verification on kiosk computing systems 104, the basic structure and the method of the invention are extended in one embodiment as follows.

Permission tokens are extended by one array for storing the creation date. The kiosk computing system 104 is extended by a mechanism for evaluation and storage of the creation date of permission tokens. The token computing system 105 is extended by a mechanism which re-issues all permission tokens and in doing so particularly updates all creation dates upon granting of a new permission or revocation of an existing permission. The verification of permission tokens with a creation date prior to the creation data stored in the kiosk computing system delivers as result the Boolean value "false", while the creation date stored in the kiosk computing system 104 is updated with the creation date stored in the permission token, if the verification of the permission token delivers the Boolean value "true".

14) In one embodiment of the permission mechanism, the method and the underlying structure, respectively, are extended in such a way that any steps of the method can be stored for the purpose of later traceability. To that end, the token computing system 105 is extended by a functional unit for storing processes, a so-called process storage.

15) A variant of the embodiment described under 14) allows the additional storage of application-relevant information in the process storage. These information can be used, inter alia, for the implementation of extended functionality in the context of the application system.

Exemplary Embodiments

In an exemplary specific realization, a special software program is installed on the user computing system 101, the software program accomplishing communication between the system components and allowing interactions with the user.

Furthermore, the user computing system 101 is connected to the internet. Now, the user must enter his or her registration information for registration, in particular a password and a username. The collected data will now be transmitted to the token computing system 105 via a secure connection, this system registering the user and binding the identity of the user to a second factor in a second step, in particular by sending a confirmation code to an address defined by the user. If the user has been registered already, the user can log-in by indication of his or her password and username as well as the confirmation of his or her identity via the second factor. After successfully logging in to the token computing system 105, further authorization is effected on various entities of the token computing system 105 via a ticket.

Furthermore, a cryptographic key pair is created by the user computing system 101 for issuing an authentication token, wherein the private key is stored at the user computing system 101 and the public key is used by the authentication computing unit 102 together with the ticket in order to generate an authentication token. This authentication token is signed with the certificate assigned to the private key of the authentication computing unit 102 and stored in a database as well as on the user computing system 101. As used herein, a certificate relates to a digital certificate, which is also called a public key certificate. Such a certificate is a structured data set that is used to relate a public key of an asymmetric cryptographic system to an identity or an institution. The certificate may be present in the X.509 standard or another standard, for example.

Now, once the user has been successfully logged in and an authentication token has been stored on the user computing system 101, a permission token can be issued by the permission computing unit 103 which can be requested from the token computing system 105 by a trustworthy entity of the application system, if required. To that end, the ID of the assigned authentication token is stored in the permission token and signed by the permission computing unit 103 to create an unambiguous and invariable link between the tokens. This permission token is again stored on the user computing system 101 and can then be used together with the authentication token in accordance with the application for granting permissions.

According to another embodiment, a special software application must be installed on the user computing system 101, and must be connected to the internet. The user may log-in "anonymously" without registration. The token computing system 105 creates an anonymous account and issues a corresponding authentication token. Typically, an anonymous account is only provided with a restricted functionality and, in particular, the account can be deleted after fulfilling the purpose. On the other hand, there is an option to assign the anonymous account to a user by a later registration.

Thus, the embodiments of the invention are particularly advantageous since also even local decisions about the authenticity of a user and the assigned permissions can be taken due to the certificate-based confidentiality structure. Furthermore, a particular advantage is that the tokens need not be categorized as being trustworthy, which is why transmission in a network or even via physical media is less critical.

Each user computing system 101 is assigned exactly one authentication token, but any number of permission tokens. One permission token is valid only in conjunction with an assigned authentication token. Each non-anonymous user can be assigned multiple user computing systems 101. Thus, multiple permission tokens may exist for one and the same permission, these tokens to be valid with different authentication tokens.

According to another embodiment, the user can define one of his or her user computing systems 101 to be the main device. The applicability of permission tokens can be restricted to a main user computing system via corresponding attributes in the authentication token and in the permission token.

The tokens stored in the user computing system 101 can now be used on a kiosk computing system 104 to achieve certain permissions in accordance with an application. To that end, the user has to locate the user computing system 101 into read-range of a physical interface of the kiosk computing system 104 in order to trigger an authentication protocol. The range depends on the communication technology used. In inductive coupling such as RFID/NFC or optical recognition of, e.g., QR codes, the range is less than in radio transmission such as WiFi or Bluetooth LE. A challenge response message is exchanged in addition to the authentication token and one or multiple permission tokens, to prove possession of the private key that fits to the public key of the authentication token. To that end, the kiosk computing system 104 usually sends a random number to the user computing system 101. The user computing system creates a signature of the random number using the private key, which is send back to the kiosk computing system 104 and verified there. In the case that the physical interface does not support a bidirectional connection, the current timestamp of the user computing system 101 is used as the challenge, which is accepted by the kiosk computing system 104 within an adjustable tolerance. In this way, it is determined that the user computer system 101 has permission to use the first data packet, i.e., the authentication token. Thus, a catch of the authentication token by an attacker is uncritical, since a successful use of the authentication token by a non-authorized computing system is excluded.

Now, originality of the permission token can be verified using the root certificate and authenticity can be verified along with the relation to the authentication token. This method can also be used when the kiosk computing system 104 does not have a connection to the token computing system 105, providing the possibility that an application is directly executed on the kiosk computing system 104, e.g., a door opener.

According to another embodiment of the invention, permission IDs can be read selectively by the user computing system 101 by selection of an application ID and one or multiple service IDs. To that end, corresponding IDs are fixedly set on the kiosk computing system 104. In another variant, these IDs can be set dynamically by the token computing system 105. In the further course, theses IDs are transmitted to the user computing system 101 via the physical interface in a suitable manner and compared to the IDs stored in the permission tokens there. After all, only permission tokens that correspond to the selection criteria are transmitted to the kiosk computing system 104.

According to another embodiment, the tokens read by the kiosk computing system 104 are transmitted to the token computing system 105 in order to verify validity of the tokens there. The tokens are verified in the authentication computing unit 102 and in the permission computing unit 103 in accordance with the versions of the tokens stored there. Therefore, it is possible to reject tokens the validity of which had previously been revoked. Verification at the token computing system 105 can be compelled via a corresponding attribute in the permission token, which allows realization of applications with higher security requirements. After successful verification of the tokens, the corresponding permission is granted in the token computing system 105.

The validity of a permission token can be composed of a defined time period and an attribute in the form of a counter defined in the token, which is set and manipulated, respectively, depending on the application. E.g., a token can be restricted with respect to the number of usages. However, the attribute can also describe the value of the permission, with this value typically being consumed when used, depending on the application.

According to another embodiment, the permission tokens stored on the user computer system 101 are graphically displayed. They can be sorted and filtered in accordance with the context, in particular location and time. As a result, view and selection of the required permission tokens, particularly when exchanging tokens via a unidirectional physical interface, is made easier for the user.

According to an extended embodiment, the method for managing permissions is extended by a functionality which allows assigning monetary values to various processes and thus enabling a clearing function. To that end, permission tokens are marked for potential use in clearing-relevant processes via a corresponding attribute. Such processes particularly include the creation date, use or lapse of permission tokens. In the further course, the token computing system 105 provides the possibility of assigning monetary values to clearing-relevant processes mapped in the process storage.

In a first variant, the issue of a permission token is effected after additional approval by a clearing system, e.g., a payment processing system, which can be part of the application system 100, be in connection with the application system 100 or be part of the kiosk.

In a second variant, the approval by the clearing system is effected at a later time, i.e., at a point in time after the issue of the permission token at the token computing system 105. For example, approval is requested by a user computer system and possibly transmitted to the kiosk computing system 104, or it is effected at the time of the verification of the permission token after transmission by the user computing system 101 to the kiosk computing system 104. In the latter case, the kiosk computing system 104 would release the functions only after receiving approval by the clearing system.

Thus, due to the data form the process storage, clearing can be effected via a payment method defined by the user, in particular via a credit card, a bank account or an application-specific current account. In this case, clearing can be effected immediately or collectively at times defined beforehand, e.g., monthly, depending on the requirements of the application and the payment method used.

According to one embodiment, each authentication token has a relatively short validity period, which can be set to one week, for example, for improving security. In order to update and extend validity, the authentication token must be changed at regular intervals. To that end, it is necessary to set a deadline for the exchange of the authentication token, in which the old authentication token must be renewed via the authentication computing unit 102. To that end, the user computing system 101 has to authenticate itself at the token computing system 105 with a challenge response method and, subsequently transmit the public key of a new cryptographic key pair to the token computing system 104 in order to update the authentication token. A new authentication token is generated, signed and sent back to the user computing system 101 then. The old token is marked as invalid. In the further course, all permission tokens bound to the old authentication token, must be replaced by new permission tokens bound to the new authentication token. It is also possible to set shorter validity periods, e.g., less than 3 days or less than 1 day.

Thus, the embodiments of the invention are particularly advantageous since higher security can be ensured by the exchange of the authentication token and the associated key pair. Replaced tokens are marked as invalid after the update. As a result, misuse can be detected and application-dependent measures can be taken, e.g., the concerned user account can be blocked.

Thus, these embodiments of the invention are particularly advantageous since the short life of the authentication token results in a short life of the assigned permission tokens. This is especially true when a permission token is revoked early and both the kiosk computing system 104 and the user computing system 101 at least temporarily do not have a data connection to the token computing system 105.

According to another embodiment, a creation date is added to the permission token, whereby a detection of revoked permission tokens at the kiosk computing system 104 without data connection to the token computing system 105 is enabled even more effectively. To that end, the token computing system 105 must update all valid permission tokens assigned to the same service to a new uniform creation date when issuing or revoking a permission. The kiosk computing system 104 includes a field for storing the latest creation date, which is updated with every reading process of a valid permission token. The kiosk computing system 104 categorizes all permission tokens that have a creation date before the stored value as being invalid.

According to a further developed embodiment, the verification of the validity of a permission token is coupled to an additional authentication step by the user. To that end, a biometrical feature, in particular a fingerprint, or a personal identification number is used as a key to additionally confirm the identity of the user. Depending on the embodiment and the security level, verification of the entered key is done either at the user computing system 101 or at the kiosk computing system 104 or at the token computing system 105.

The invention claimed is:

1. A method for managing authorizations on an arrangement having multiple computing systems, the method comprising:
   generating, by a first computing system, a first data packet which comprises a unique identifier identifying the first data packet, and which is used to identify a user, the first data packet being provided with a signature by the first computing system;
   generating, separately from the first data packet, at least one second data packet by the first computing system, wherein each of the at least one second data packet indicates an authorization, wherein the unique identifier of the first data packet is stored in each of the at least one second data packet, and wherein each of the at least one second data packet is provided with a signature from a permission computing unit of the first computing system;
   transmitting, by the first computing system, the first and the at least one second data packets to a user computing system, wherein each user computing system is assigned only one first data packet and any number of the at least one second data packets; and
   enabling a function on an application system, which is different from the user computing system, after performing the following steps:
      receiving the first and the at least one second data packets from the user computing system;
      verifying whether the user computing system is authorized to use the first data packet;
      verifying whether the first and the at least one second data packets are provided with a valid signature;
      verifying whether the first and the at least one second data packets are associated; and
      verifying whether an authorization information contained in the at least one second data packet authorizes enabling of the function on the application system.

2. The method according to claim 1, wherein the user computing system is a mobile data processing device.

3. The method according to claim 1, wherein the enabling comprises independently performing a connection to the first computing system, by which the first and the at least one second data packet were generated.

4. The method according to claim 1, wherein the enabling is performed by a kiosk computing system, which is an independent computing unit of the application system.

5. The method according to claim 4, wherein a preselection of data packets to be transmitted is effected in the user computer system.

6. The method according to claim 5, wherein the preselection is based upon data which are transmitted from the kiosk computing system to the user computing system.

7. The method according to claim 5, wherein the preselection is effected based upon user settings.

8. The method according to claim 5, wherein the preselection is effected based upon a time and/or location information.

9. The method according to claim 1, wherein a verification of the validity of the first and/or the at least one second data packet is performed.

10. The method according to claim 1, wherein the validity of the first and/or the at least one second data packet is bound to a main device defined by the user.

11. The method according to claim 1, wherein the validity of the first and/or the at least one second data packet is bound to a predetermined time period.

12. The method according to claim 1, wherein the validity of the at least one second data packet is bound to at least one value, which is defined depending on an application.

13. The method according to claim 1, wherein enabling of a functionality due to the at least one second data packet includes a clearing of performed process, and wherein the enabling of the functionality requires an additional approval by a clearing system.

14. The method according to claim 1, wherein a validity period of the first data packet is shorter than one week, and wherein a corresponding regular exchange of the first and the at least one second data packets is performed.

15. The method according to claim 1, wherein a creation date is contained in the at least one second data packets and used to classify the at least one second data packets with a create date prior to a creation data stored on a kiosk computing system to be invalid, wherein the first computing system updates all creation dates upon granting of a new permission or revocation of an existing permission.

16. The method according to claim 1, wherein a validity verification of the data packets is bound to an additional authentication step by the user.

17. The method according to claim 1, wherein the user is authenticated via a 2-factor system for initially issuing the first data packet.

18. The method according to claim 1, wherein the first data packet is created for anonymous use.

19. An arrangement having multiple computing systems comprising:
   a memory storage comprising instructions; and
   one or more processors in communication with the memory storage, wherein the one or more processors execute the instructions to:
   generate a first data packet, which comprises a unique identifier for identifying the first data packet, and which is used to identify a user and to provide the first data packet with a signature;
   generating, separately from the first data packet, at least one second data packet, wherein each of the at least second data packet indicates an authorization, and wherein the unique identifier of the first data packet is stored in each of the at least one second data packet;
   provide each of the at least second data packet with a signature from a permission computing unit of a first computing system;
   transmit the first and at least one second data packets to a user computing system, wherein each user computing system is assigned only one first data packet and any number of the at least one second data packets; and
   enable a function on an application system, which is different from the user computing system, after performing the following steps:
      receiving the first and the at least one second data packets from the user computing system;
      verifying whether the user computing system is authorized to use the first data packet;
      verifying whether the first and the at least one second data packets are provided with a valid signature;

verifying whether the first and the at least one second data packets are associated; and verifying whether an authorization information contained in the at least one second data packet authorizes enabling of the function on the application system.

* * * * *

UNITED STATES PATENT AND TRADEMARK OFFICE
CERTIFICATE OF CORRECTION

PATENT NO. : 10,587,610 B2
APPLICATION NO. : 15/548198
DATED : March 10, 2020
INVENTOR(S) : Markus Pistauer et al.

Page 1 of 1

It is certified that error appears in the above-identified patent and that said Letters Patent is hereby corrected as shown below:

In the Claims

In Column 12, Line 25, Claim 15, delete "create" and insert --creation--.

Signed and Sealed this
Eighteenth Day of August, 2020

Andrei Iancu
*Director of the United States Patent and Trademark Office*